United States Patent
Yamasaki et al.

(10) Patent No.: US 8,304,942 B2
(45) Date of Patent: Nov. 6, 2012

(54) DRIVE APPARATUS ADAPTED TO PROMOTE HEAT DISSIPATION FROM ELECTRONIC CIRCUIT INTEGRATED THEREIN

(75) Inventors: Masashi Yamasaki, Obu (JP); Hideki Kabune, Nagoya (JP); Atsushi Furumoto, Nukata-gun (JP)

(73) Assignee: Denso Corporation, Kariya (JP)

( * ) Notice: Subject to any disclaimer, the term of this patent is extended or adjusted under 35 U.S.C. 154(b) by 229 days.

(21) Appl. No.: 12/822,396

(22) Filed: Jun. 24, 2010

(65) Prior Publication Data
US 2010/0327678 A1    Dec. 30, 2010

(30) Foreign Application Priority Data
Jun. 24, 2009    (JP) ................... 2009-149645

(51) Int. Cl.
 *H02K 9/00*    (2006.01)
 *H02K 11/00*    (2006.01)
(52) U.S. Cl. .................. 310/64; 310/68 A; 310/68 R
(58) Field of Classification Search ............... 310/68 D, 310/68 A, 68 R, DIG. 6, 71; *H02K 11/00, H02K 11/02, 11/04*
 See application file for complete search history.

(56) References Cited

U.S. PATENT DOCUMENTS

| | | | |
|---|---|---|---|
| 6,081,056 A * | 6/2000 | Takagi et al. | 310/89 |
| 6,577,030 B2 * | 6/2003 | Tominaga et al. | 310/68 B |
| 6,580,194 B2 * | 6/2003 | Mizutani et al. | 310/239 |
| 6,998,740 B2 * | 2/2006 | Matsuki | 310/64 |
| 7,021,418 B2 * | 4/2006 | Tominaga et al. | 180/444 |
| 7,193,343 B2 * | 3/2007 | Tsuge et al. | 310/68 B |
| 7,541,703 B2 * | 6/2009 | Uehara et al. | 310/68 D |
| 7,898,126 B2 * | 3/2011 | Kato et al. | 310/58 |
| 2008/0136265 A1 | 6/2008 | Mizukoshi et al. | |

FOREIGN PATENT DOCUMENTS

| | | | |
|---|---|---|---|
| JP | 58141646 A | * | 8/1983 |
| JP | 03-089837 | | 4/1991 |
| JP | 2002-345211 | | 11/2002 |
| JP | 2004-120941 | | 4/2004 |
| JP | 2006149038 A | * | 6/2006 |
| JP | P2008-167641 A | | 7/2008 |
| JP | 2008-198981 | | 8/2008 |
| WO | WO 2010/150527 | | 12/2010 |
| WO | WO 2010/150528 | | 12/2010 |
| WO | WO 2010/150529 | | 12/2010 |
| WO | WO 2010/150530 | | 12/2010 |

OTHER PUBLICATIONS

JPO Machine Translation, Brushless Motor, JP-2006149038A, Jan. 31, 2012, http://dossier.ipdl.inpit.go.jp/text_trans.html.*
The 3 Phase Power Resource Site, 3 Phase Motor, pp. 2/2, Jan. 31, 2012, http://www.3phasepower.org/3phasemotors.htm.*

(Continued)

*Primary Examiner* — Quyen Leung
*Assistant Examiner* — Thomas Truong
(74) *Attorney, Agent, or Firm* — Nixon & Vanderhye PC

(57) ABSTRACT

A drive apparatus has a motor device having a tubular motor case. A stator is arranged radially inside the motor case. A rotor is arranged radially inside the stator. A shaft is rotatable with the rotor. An electronic circuit is arranged in the central axis direction of the shaft relative to the motor case. A choke coil has a hole in a central part thereof, in which the shaft is inserted.

49 Claims, 14 Drawing Sheets

OTHER PUBLICATIONS

Japanese Office Action dated Apr. 25, 2011, issued in corresponding Japanese Application No. 2009-149645 with English Translation.
U.S. Appl. No. 12/822,412, Minato et al, filed Jun. 24, 2010.
U.S. Appl. No. 12/822,403, Minato et al, filed Jun. 24, 2010.
U.S. Appl. No. 12/822,614, Fujita et al, filed Jun. 24, 2010.
U.S. Appl. No. 12/822,635, Miyachi et al, filed Jun. 24, 2010.
U.S. Appl. No. 12/822,381, Iwai et al, filed Jun. 24, 2010.
U.S. Appl. No. 12/822,627, Yamasaki et al, filed Jun. 24, 2010.

* cited by examiner

DRIVE APPARATUS ADAPTED TO PROMOTE HEAT DISSIPATION FROM ELECTRONIC CIRCUIT INTEGRATED THEREIN

CROSS REFERENCE TO RELATED APPLICATION

This application is based on and incorporates herein by reference Japanese Patent Application No. 2009-149645 filed on Jun. 24, 2009.

FIELD OF THE INVENTION

The present invention relates to a drive apparatus such as an electronic circuit-integrated motor device, in which an electronic circuit is integrated.

BACKGROUND OF THE INVENTION

An electric power assist system, which generates torque electrically, is used more and more in recent years as a mechanism for assisting the steering operation of a steering wheel of a vehicle. As an electric motor as a power generation source of the electric power assist system, a brushless motor is used for example. The brushless motor is driven to rotate by application of three-phase alternating currents. It is necessary to generate the alternating currents of different phases from a direct current power source of a predetermined voltage (for example, 12 volts) so that coil currents of different phases are supplied to coils of a plurality of phases (for example three phases). An electronic circuit is thus needed to switch over the coil currents. The electronic circuit includes a semiconductor module, a noise filtering aluminum electrolytic capacitor, a noise filtering choke coil, a microcomputer and the like. A semiconductor chip, which performs the switching operation, is integrated within the semiconductor module. It is proposed to arrange the electronic circuit near the motor (for example, patent document 1).

Patent document: JP 2002-345211A

A comparatively large motor is normally used in the electric power assist system to provide sufficient torque. Further, a large aluminum electrolytic capacitor and a choke coil are normally provided on the electronic circuit to protect the semiconductor module from being broken by surge voltages generated by the current switching operation and to reduce electric power source noise.

A variety of systems are also provided recently in a vehicle in addition to the electric power assist system. These systems need respective spaces in the vehicle to be mounted. The motor itself of the electric power assist system is thus required to be smaller in size. According to the motor disclosed in the patent document 1, the semiconductor module and electronic parts such as the aluminum electrolytic capacitor are arranged in the axial direction of the motor.

The choke coil has a comparatively large volume and occupies a large space in case it is mounted on a printed circuit board of the electronic circuit. Even if the choke coil is ring-shaped and arranged perpendicularly to the printed circuit board, it is likely that its winging becomes non-uniform partly and magnetic field leaks. The choke coil is provided in a power cable of the semiconductor module. Since a large current flows in the choke coil, the choke coil must be arranged to promote heat dissipation.

SUMMARY OF THE INVENTION

It is therefore an object of the present invention to provide a drive apparatus, which integrates therein an electronic circuit including a choke coil and promotes heat dissipation of the choke coil.

According to the present invention, a drive apparatus comprises a motor and an electronic circuit. The motor has a cylindrical motor case, a stator, a rotor and a shaft. The stator is arranged radially inside the motor case and wound with coils of a plurality of phases. The rotor is arranged radially inside the stator. The shaft is rotatable with the rotor. The electronic circuit has a semiconductor module, a capacitor and a choke coil. The semiconductor module is arranged in the axial direction of the shaft relative to the motor case and configured to switch over coil currents flowing in the coils of the plurality of phases. The capacitor is connected in parallel to a power line and a ground line of the semiconductor module. The choke coil is provided in the power line of the semiconductor module. The choke coil has a hole in a central part thereof and the shaft is inserted into the choke coil.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

First Embodiment

Figure 1:
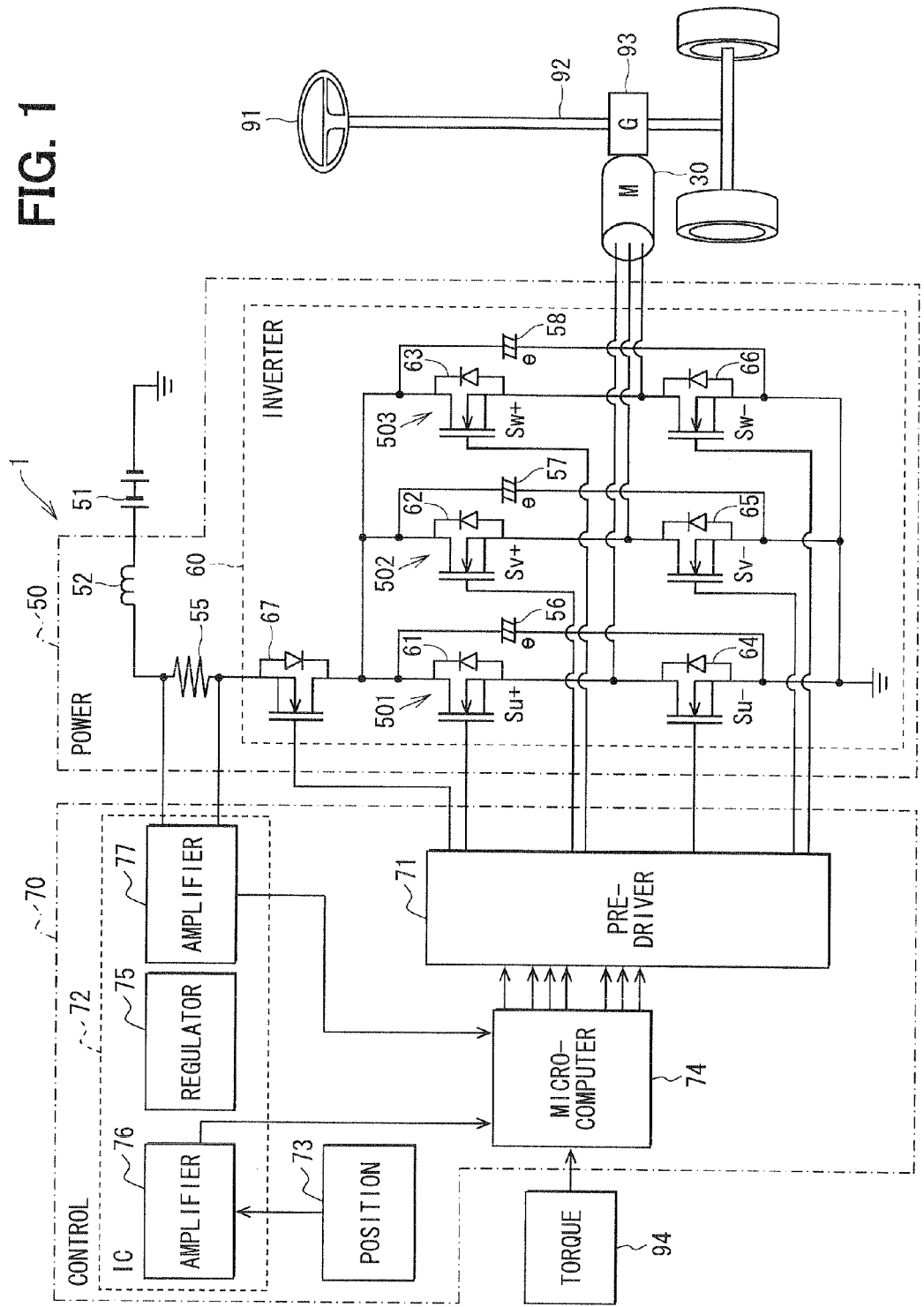
FIG. 1 is an electric circuit diagram showing an electric power steering system.

An electronic circuit-integrated motor device according to the first embodiment is provided for an electric power assist system such as an electric power steering system (EPS system), which is a power assist system exemplified in FIG. 1.

Referring first to FIG. 1, a drive apparatus 1 includes a motor 30, a power circuit 50 and a control circuit 70. The drive apparatus 1 provides steering assist to a steering wheel 91 of a vehicle by generating a rotary torque for a column shaft 92 through a gear 93 mounted on the column shaft 92, which is a rotating shaft of the steering wheel 91. More specifically, when the steering wheel 91 is operated by a driver, a torque sensor 94 detects a steering torque that is generated for the column shaft 92 as a result of steering. Further, a vehicle speed signal is acquired from a CAN (controller area network), which is not shown, to provide steering assist to a driver who steers the steering wheel 91. The use of this mechanism, depending on the employed control method, will make it possible not only to provide steering assist, but also to provide automatic control of operations of the steering wheel 91 for the purpose, for instance, of causing the vehicle to stay in a traffic lane on an expressway or guiding the vehicle into a parking space in a parking lot.

The motor 30 is a brushless motor that rotates the gear 93 in a normal direction and in a reverse direction. The power circuit 50 supplies electrical power to the motor 30. The power circuit 50 includes a choke coil 52, which is positioned in a power supply cable from a power source 51, a shunt resistor 55, and an inverter circuit 60.

The inverter circuit 60 includes seven metal oxide semiconductor field effect transistors (MOSFETs) 61, 62, 63, 64, 65, 66, 67, which are classified as one of a variety of types of field effect transistors. The MOSFETs 61 to 67 are switching elements. More specifically, the path between the source and drain of each MOSFET turns on (closes) or off (opens) depending on the electric potential applied to the gate.

The MOSFETs 61 to 67 are hereinafter referred to as FETs 61 to 67, respectively. The FET 67, which is connected most closely to the shunt resistor 55 serves as a power relay that prevents an electrical current from flowing in a reverse direction when the power source 51 is erroneously connected in polarity.

The drains of the three FETs 61 to 63 are connected to the power supply cable side, that is, high potential side. The sources of the FETs 61 to 63 are connected to the drains of the remaining three FETs 64 to 66 at the low potential side, respectively. The gates of the six FETs 61 to 66 as well as the gate of the FET 67 are connected to output terminals of a pre-driver circuit 71. Three connection points (junctions) between the series-connected FETs among FETs 61 to 66 are respectively connected to a U-phase coil, a V-phase coil, and a W-phase coil of the motor 30.

In the following description, if necessary, the FETs 61 to 66 are referred to as FET (Su+) 61, FET (Sv+) 62, FET (Sw+) 63, FET (Su−) 64, FET (Sv−) 65 and FET (Sw−) 66, respectively.

An aluminum electrolytic capacitor 56 is connected in parallel between the power supply cable of the FET (Su+) 61 and the ground of the FET (Su−) 64. Similarly, an aluminum electrolytic capacitor 57 is connected in parallel between the power supply cable of the FET (Sv+) 62 and the ground of the FET (Sv−) 65. An aluminum electrolytic capacitor 58 is connected in parallel between the power supply cable of the FET (Sw+) 63 and the ground of the FET (Sw−) 66. Each of the aluminum electrolytic capacitors 56 to 58 are simply referred to as the capacitor.

The control circuit 70 includes the pre-driver circuit 71, a customized integrated circuit (custom IC) 72, a position sensor 73 and a microcomputer 74. The custom IC 72 includes three functional blocks, that is, a regulator circuit 75, a position sensor signal amplifier circuit 76 and a detected voltage amplifier circuit 77.

The regulator circuit 75 is a stabilization circuit that stabilizes the power source voltage. The regulator circuit 75 stabilizes the supply of electrical power to various units. For example, the regulator circuit 75 ensures that the microcomputer 74 operates on a predetermined stabilized supply voltage (e.g., 5 V).

The position sensor signal amplifier circuit 76 inputs a signal from the position sensor 73. The position sensor 73 is provided in the motor 30 and outputs a rotational position signal of the motor 30. The position sensor signal amplifier circuit 76 amplifies the rotational position signal and outputs the amplified rotational position signal to the microcomputer 74.

The detected voltage amplifier circuit 77 detects a voltage across the shunt resistor 55 installed in the power circuit 50, amplifies the detected voltage indicative of the coil current supplied to the motor 30, and outputs the amplified voltage to the microcomputer 74.

Consequently, the rotational position signal of the motor 30 and the voltage across the shunt resistor 55 are applied to the microcomputer 74. A steering torque signal is also applied to the microcomputer 74 from the torque sensor 94 mounted on the column shaft 92. In addition, the vehicle speed signal is inputted to the microcomputer 74 through the CAN.

Upon receipt of the steering torque signal and the vehicle speed signal, the microcomputer 74 controls the inverter circuit 60 through the pre-driver circuit 71 in accordance with the rotational position signal and in such a manner as to provide steering assist to the steering wheel 91 in accordance with vehicle speed. More specifically, the inverter circuit 60 is controlled by turning on or off the FETs 61 to 66 through the pre-driver circuit 71. As the gates of the six FETs 61 to 66 are connected to the six output terminals of the pre-driver circuit 71, the pre-driver circuit 71 changes the potentials of the gates.

Further, the microcomputer 74 controls the inverter circuit 60 in accordance with the voltage across the shunt resistor 55, which is input from the detected voltage amplifier circuit 77, so that the electrical current is supplied to the motor 30 in generally a sine wave form.

The choke coil 52 is provided to suppress power source noise. The capacitors 56 to 58 store electric charge therein to assist power supply to the FETs 61 to 66 and suppress noise components such as surge voltages. Since the FET 67 is provided for protection from reverse connection of the power source 51, the capacitors 56 to 58 will not be damaged or broken even when the power source 51 is erroneously connected.

For controlling the operation of the motor 30, the power circuit 50 and a control circuit 70 are provided. The power circuit 50 and the control circuit 70 are configured as an electronic control unit (ECU). The drive apparatus 1 has a unique integrated configuration of the ECU.

The motor 30 used in the EPS has its output power of about 200 W to 500 W. The power circuit 50 and the control circuit 70 occupy physically about 20% to 40% of space in the drive apparatus 1. Since the output power of the motor 30 is large, the power circuit 50 correspondingly becomes large and occupies more than 70% of the total area of the power circuit 50 and the control circuit 70.

Among parts forming the power circuit 50, the choke coil 52, the capacitors 56 to 58 and the semiconductor modules 51 to 53 including the FETs 61 to 67 occupy more than 70% of the area of the power circuit 50 and the control circuit 50.

The FET 67, which is for protection from reverse connection, the FET (Su+) 61 and the FET (Su−) 64 are configured as semiconductor chips. These semiconductor chips are resin-molded in one semiconductor module 501. The FET (Sv+) 62 and FET (Sv−) 65 are also configured as semiconductor chips. These semiconductor chips are resin-molded in one semiconductor module 502. The FET (Sw+) 63 and FET (Sw−) 66 are also configured as semiconductor chips. These semiconductor chips are resin-molded in one semiconductor module 503.

Figure 2:
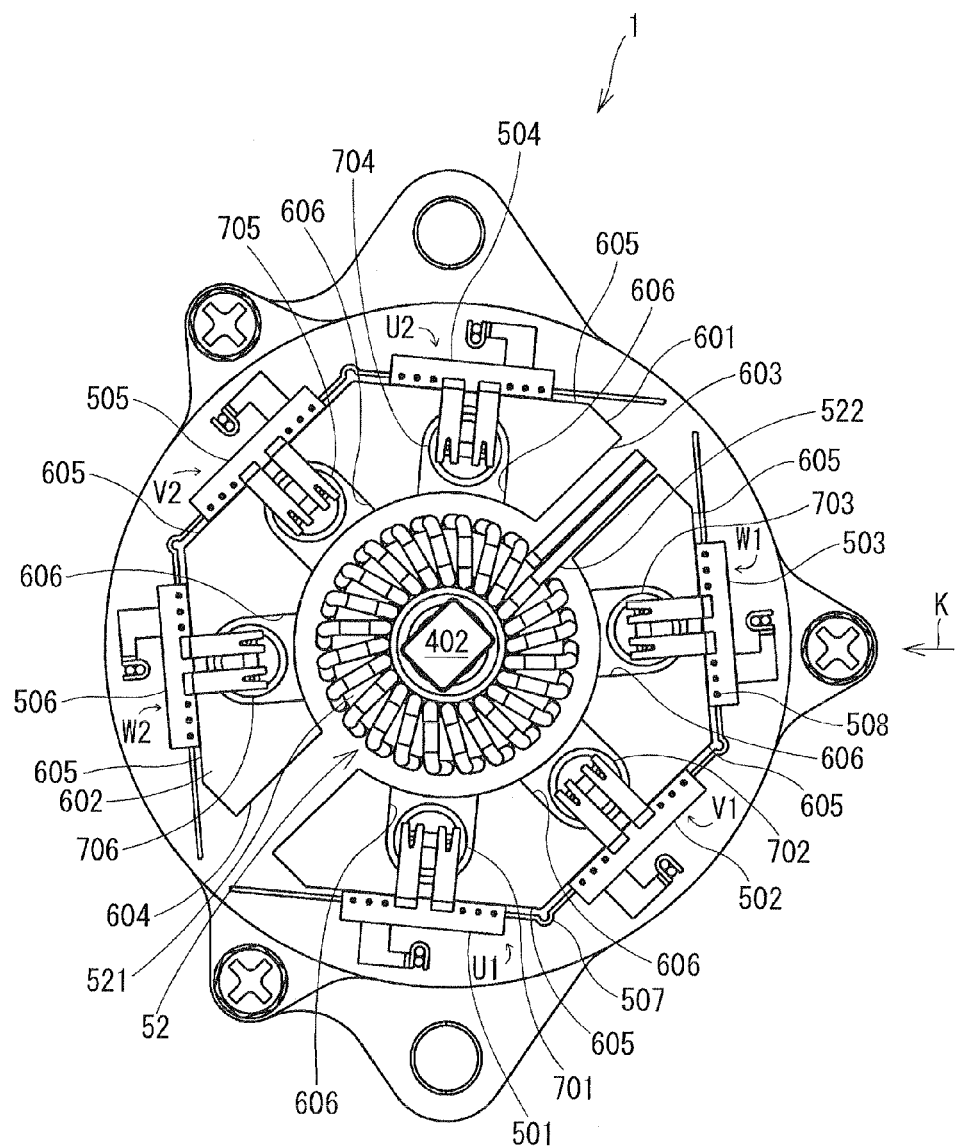
FIG. 2 is a top plan view showing a drive apparatus, which is used in the electric power steering system, according to the first embodiment of the present invention.

The inverter circuit 60 is thus configured by three semiconductor modules 501 to 503. In this embodiment, although only one inverter circuit 60 is shown, another inverter circuit is provided so that the current, which flows in each inverter circuit 60 is reduced to one-half. Since two inverter circuits 60 are used, six semiconductor modules 501 to 506 and six capacitors 701 to 706 are provided as shown in FIG. 2.

Figure 4:
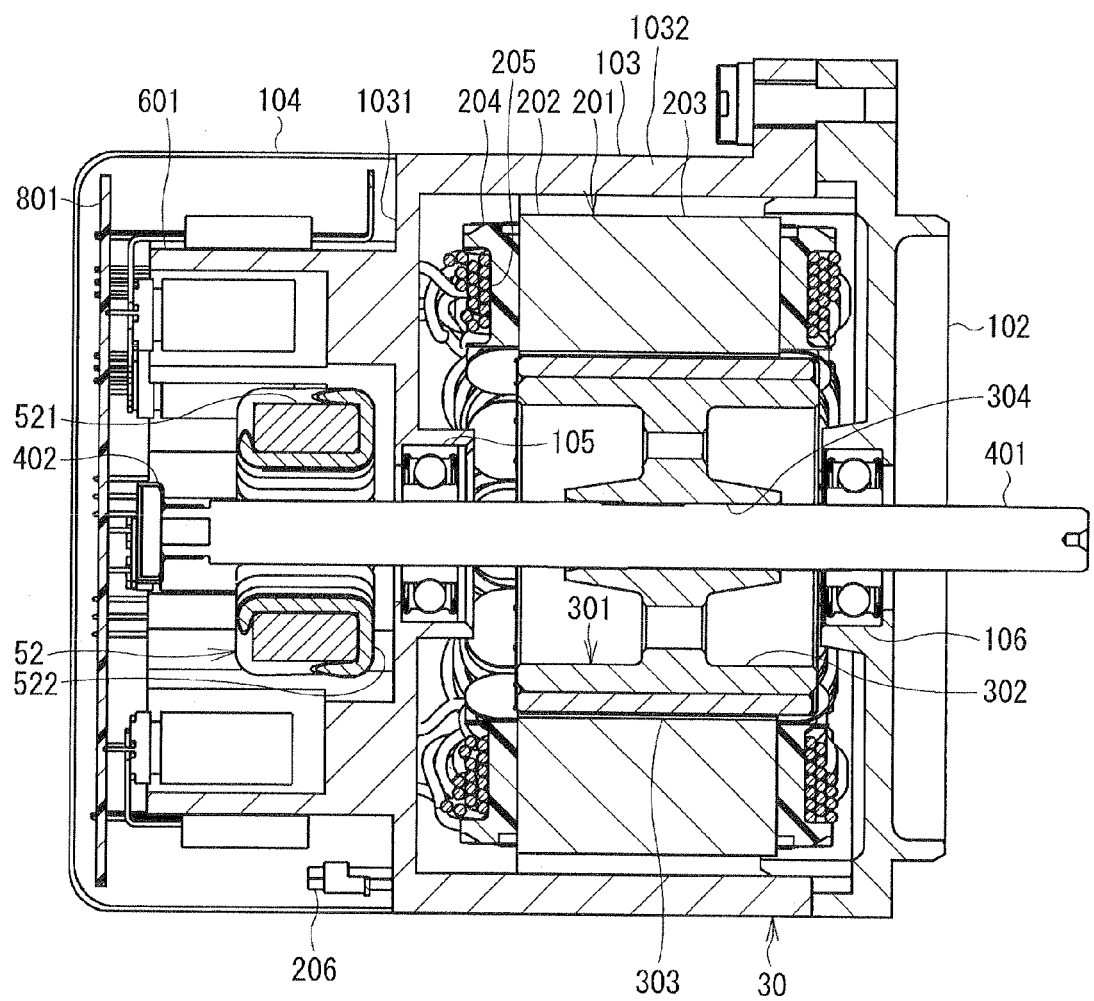
FIG. 4 is a cross-sectional view showing the drive apparatus according to the first embodiment, which is taken along the line IV-IV in FIG. 3.

As best shown in FIG. 4, the drive apparatus 1 has a motor housing that includes a tubular motor case 103 made of metal; an end frame 102, which is screw-fastened to one axial end of a cylindrical part 1032 of the motor case 103; and a cover 104, which is in a bottomed cylindrical shape fitted over the other axial end of the cylindrical part 1032 of the motor case 103 to cover the electronic circuit part therein. An electric connector (not shown) for connection to the power source 51 is attached to the cover 103.

The motor 30 also has a stator 201 positioned on the radially inside part of the cylindrical part 1032 of the motor case 103, a rotor 301 positioned in the radially inside part of the stator 201, and a shaft 401 made of metal and fit firmly in the rotor 301 to rotate together with the rotor 301.

The motor case 103 has, in addition to the cylindrical part 1032 for fixing the stator 201, a partition wall 1031 extending radially inward from the axial end of the cylindrical part 1032. The partition wall 1031 partitions the stator 201 and the rotor 301 from the outside.

The stator 201 includes twelve salient poles 202, which protrude in the radially inward direction from the inner side wall of the cylindrical part 1032. The salient poles 202 are disposed at predetermined angular intervals in the circumferential direction of the cylindrical part 1032. The salient poles 202 each include a multi-layer core 203, which is formed by a stack of thin magnetic plates, and an insulator 204, which fits with the axially outer end of the multi-layer core 203. Coils (windings) 205 are wound on the insulator 204. Each of the coils 205 is a three-phase winding of a U-phase, a V-phase or a W-phase and has two sets of U-phase, V-phase or W-phase. The coils 205 of each set are connected in Δ-shape, for instance. A lead wire 206 of each coil 205 is taken out from six holes provide in the partition wall 1031 of the motor case 103. As described later and shown in FIGS. 4 and 5, the lead wires 206 are routed from the partition wall 1031 of the motor case 103 to the radially outside part of the semiconductor modules 501 to 506.

The rotor 301 is made, for instance, of iron or other magnetic materials and formed into the tubular shape. The rotor 301 includes a rotor core 302 and permanent magnets 303 that are fixed to the radially outside part of the rotor core 302. The magnets 303 are magnetized in N-pole and S-pole alternately in the circumferential direction of the rotor 301.

Figure 6:
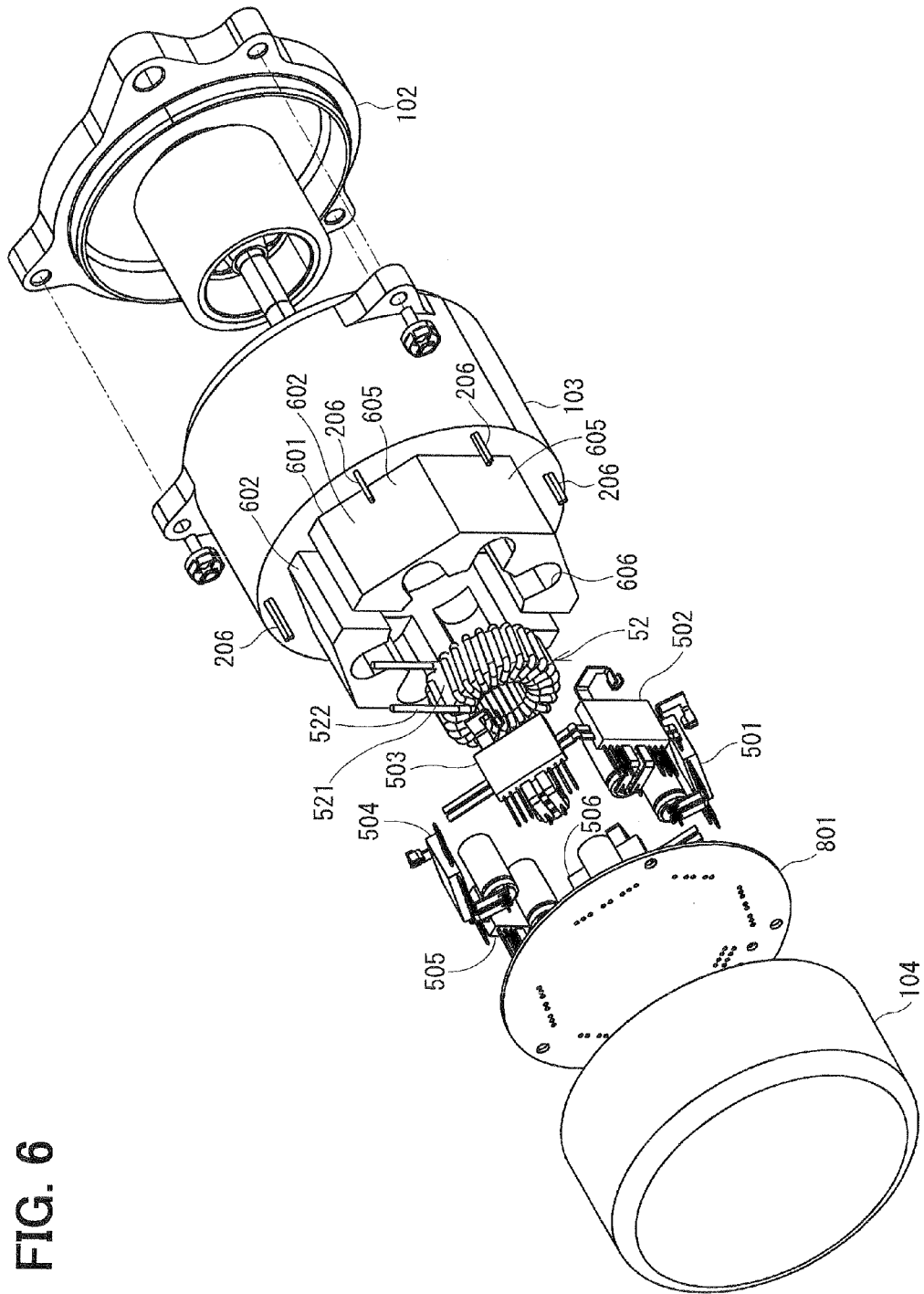
FIG. 6 is an exploded perspective view showing the drive apparatus according to the first embodiment.

The shaft 401 is fixedly fastened to a shaft hole 304 formed at the axial and radial center of the rotor core 302. The shaft 401 is rotatably supported by a bearing 105 in the partition wall 1031 of the motor case 103 and by a bearing 106 in the end frame 102. This ensures that the shaft 401 can rotate together with the rotor 301 with respect to the stator 201. The shaft 401 passes through the choke coil 52, which has a ring shape as illustrated in FIG. 2 and more specifically a cylinder shape as illustrated in FIG. 6, and extends toward the printed circuit board 801 of the control circuit 70. The axial end of the shaft 401 that is positioned closely to the printed circuit board 801 is provided with a magnet 402 for detecting the rotational position. The printed circuit board 801 is made of resin and positioned near the axial end of the shaft 401. The printed circuit board 801 is positioned in a space between the cover 103 and a heat sink 601 that is formed integrally with the motor case 103 and made of metal. The control circuit 70 (FIG. 1) is formed on the printed circuit board 801.

More specifically, a conductive wiring pattern is formed on the printed circuit board 801 by etching or other method, and an IC or other circuit forming the control circuit 70 is mounted on the printed circuit board 801. The position sensor 73 (FIG. 1) is also mounted at the center of the printed circuit board 801. The position sensor 73 detects the rotational position of the magnet 402, that is, the rotational position of the shaft 401. A virtual straight line obtained by extending the central axis of the shaft 401 is referred to as the rotation axis of the motor 30.

Figure 7A:
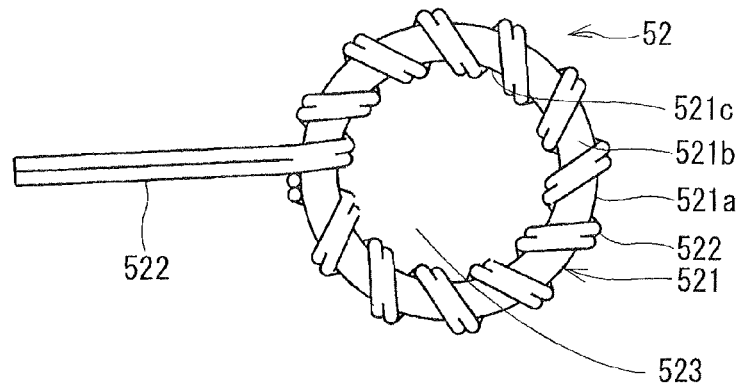
FIGS. 7A, 7B and 7C are a plan view, a side view and a perspective view showing a choke coil used in the drive apparatus according to the first embodiment.

As described above, the power circuit 50 includes the choke coil 52, the shunt resistor 55 and two inverter circuits 60. The choke coil 52 is formed in a ring shape as shown in FIG. 2. The ring shape has a central hole 523 as shown in FIG. 7A, for instance, so that it may be positioned to surround the shaft 401. A heat sink 601 is formed around the choke coil 52.

Figure 5:
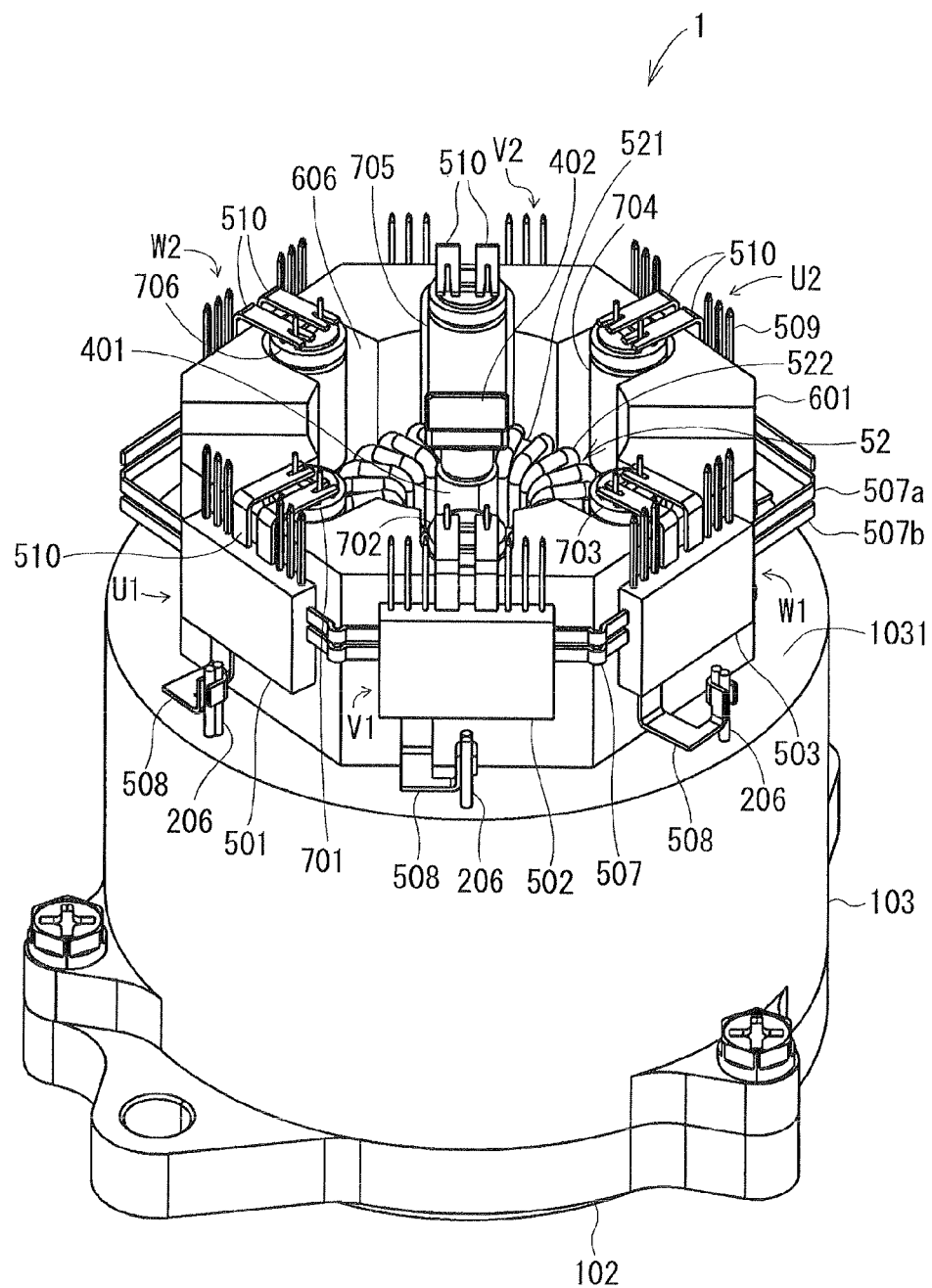
FIG. 5 is a perspective view showing the drive apparatus according to the first embodiment.

As shown in FIGS. 4 to 6, the heat sink 601 is formed on the motor case 103. The heat sink 601 is formed on the partition wall 1031 of the motor case 103 in a raised or protruded manner from the partition wall 1031. The heat sink 601 is formed integrally with the partition wall of the motor case 103 and extends in the axial direction of the shaft 401 toward the printed circuit board 801. The heat sink 601 includes two columnar members 602. Their cross sections, which are perpendicular to the axial direction of the shaft 401 are substantially trapezoidal in shape (FIG. 6). The two columnar members 602 are disposed in such a manner that the rotation axis of the motor 30 is sandwiched therebetween as exemplified in FIG. 2. Further, the columnar members 602 each have an arc portion that is cut to form an arc around the rotation axis of the motor 30. The arc portion forms a cylindrical space at the center of the heat sink 601 to accommodate the choke coil 52 therein.

That is, the heat sink 601 is formed in a shape, which is like a thick-walled cylinder that has a side wall part 602 around the columnar space formed around the shaft 401. Two cut parts 603 and 604 are formed in the side wall part 602 as a discontinuous part. The side wall part 602 of the heat sink 601 has six side wall surfaces 605, which face radially outward, in the circumferential direction. An accommodation hole part 606 is formed at the radially inside part of the side wall parts 602 such that the accommodation part 606 opens toward the central cylindrical space.

Relative to the heat sink 601, the choke coil 52 is accommodated within the cylindrical space formed in the central part of the heat sink 601. As shown in FIG. 4, the choke coil 52 is interposed between the shaft 401 and the heat sink 601. The choke coil 52 is spaced apart from the shaft 401 and the heat sink 601 in the radial direction with small clearances so that the choke coil 52 may be readily attached and detached.

The choke coil 52 is also spaced apart from the magnet 402 of the rotation detection sensor, so that the magnetic field generated by the choke coil 52 will not influence the magnetic field generated by the magnet 402. To maximally suppress the influence of the magnetic field of the choke coil 52 on the magnetic field of the magnet 402, the choke coil 52 is arranged closely to the bearing 105 in the axial direction as much as possible.

Figure 7B:
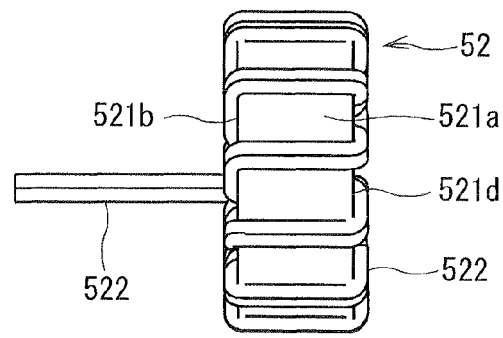
Figure 7C:
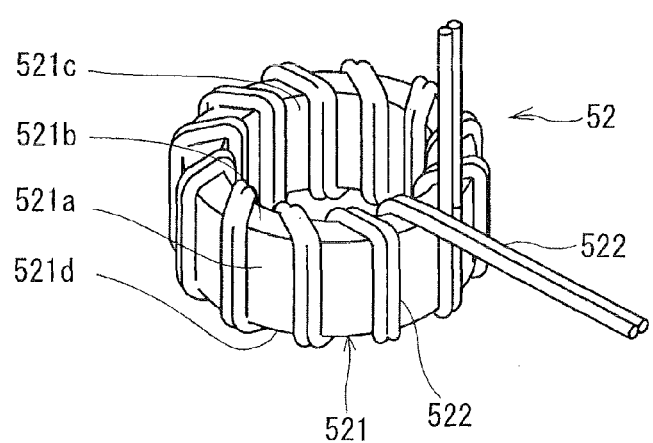

As shown in FIGS. 7A to 7C, the choke coil 52 includes a core 521 and a coil winding 522. The core 521 is formed in a ring-shape, which has a through hole in the radially central part and a certain thickness in the central axis direction. The core 521 has an outer side surface 521a and an inner side surface 521c in parallel in the radial direction. The core 521 also has one end surface 521b and the other end surface 521d in parallel in the axial direction.

The coil winding 522 is wound about the core 521 in such a manner that its one turn starts from the one end surface 521b, transverses the inner side surface 521c, the other end surface 521d and the outer side surface 521a, and returns to the one end surface 521b. This turn repeats a plurality of times about the core 521 in the circumferential direction.

Both terminal ends of the coil winding 522 of the choke coil 52 are taken out outward in the radial direction through the cut part 603 formed in one heat sink 601. Although not shown in FIGS. 2 to 6, the coil winding 522 of the choke coil 52 taken out radially outward is connected to the power cable so that the choke coil 52 is provided in the power cable as shown in FIG. 1.

As described above, the seven FETs 61 to 67, which form the inverter circuit 60 of the power circuit 50, are configured in three semiconductor modules, for example 501 to 503. The drive apparatus 1 has two inverters 60 and hence a total of six semiconductor modules 501 to 506 (FIG. 2).

In case of differentiating the semiconductor modules 501 to 506, they are referenced to as a U1 semiconductor module 501, a V1 semiconductor module 502, a W1 semiconductor module 503, a U2 semiconductor module 504, a V2 semiconductor module 505 and a W2 semiconductor module 506 as indicated in FIG. 2.

The U1 semiconductor module 501 has therein the FETs 61 and 64 for the U-phase and the FET 67 for protection from reverse connection. The V1 semiconductor module 502 has therein the FETs 62 and 65 for the V-phase. The W1 semiconductor module has therein the FETs 63 and 66 for the W-phase. Similarly, the U2 semiconductor module 504 has therein the FETs 61 and 64 for the U-phase and the FET 67 for protection from reverse connection. The V2 semiconductor module 505 has therein the FETs 62 and 65 for the V-phase. The W2 semiconductor module has therein the FETs 63 and 66 for the W-phase.

The three semiconductor modules 501, 502 and 503 of U1, V1 and W1 form one set of the inverter circuit 60. The other three semiconductor modules 504, 505 and 506 of U2, V2 and W2 form the other set of inverter circuit 60.

The three semiconductor modules 501 to 503 of U1 to W1 forming one set of inverter circuit 60 and the three semiconductor modules 504 to 506 of U2 to W2 forming the other set of inverter circuit 60 are linked by a link member 507 to form a semiconductor module unit. The link member 507 has two bus bars 507a and 507b arranged in parallel in the axial direction as shown in FIG. 5. The bus bar 507a is used as the power cable and located at a remote side from the partition wall 1031 of the motor case 103. The bus bar 507b is used as the ground cable and arranged at a close side to the partition wall 1031 of the motor case 103. Thus, the electric power is supplied to the semiconductor modules 501 to 506 through the bus bar set.

Although not shown, an electric connector is attached to the cover 104 so that the electric power is supplied to the link member 507 through the connector. The semiconductor modules 501 to 506 are attached to the heat sink 601, which extends from the partition wall 1031 of the motor case 103 in the axial direction of the shaft 401.

The heat sink 601 has a hexagonal cross section so that it has six side wall surfaces 605, which face outward in the radial direction. Each semiconductor module 501 to 506 is provided on the side wall surface 605 in correspondence. Each of the semiconductor modules 501 to 506 is plate-shaped and extends in the direction of the surface of the molded semiconductor chip. One of the surfaces having relatively large surface area is used as the heat dissipation surface. For example, metals such as copper are exposed in the heat dissipation surface. The semiconductor modules 501 to 506 are arranged such that the heat dissipation surfaces contact the side wall surfaces 605, respectively. The side wall surface 605 is planar, i.e. the heat sink is formed to have a planar surface at least partly on a side wall, the planer surface being linear in a plane perpendicular to the central axis of the shaft 41, and hence the heat dissipation surface of the semiconductor module 501 to 506 is also planar correspondingly to provide a planar contact therebetwen.

Since the semiconductor modules 501 to 506 are attached to the side wall surfaces 605 of the heat sink 601, the line perpendicular to the surface of the semiconductor chip surface is perpendicular to the central axis of the shaft 401. The semiconductor modules 501 to 506 are thus arranged perpendicularly in such a manner that the side surfaces of the largest surface area are in parallel with the side wall surfaces 605 of the heat sink 601. Each semiconductor module 501 to 506 and the choke coil 52 are arranged in the radial direction, that is, in the direction perpendicular to the central axis of the shaft 401.

Figure 3:
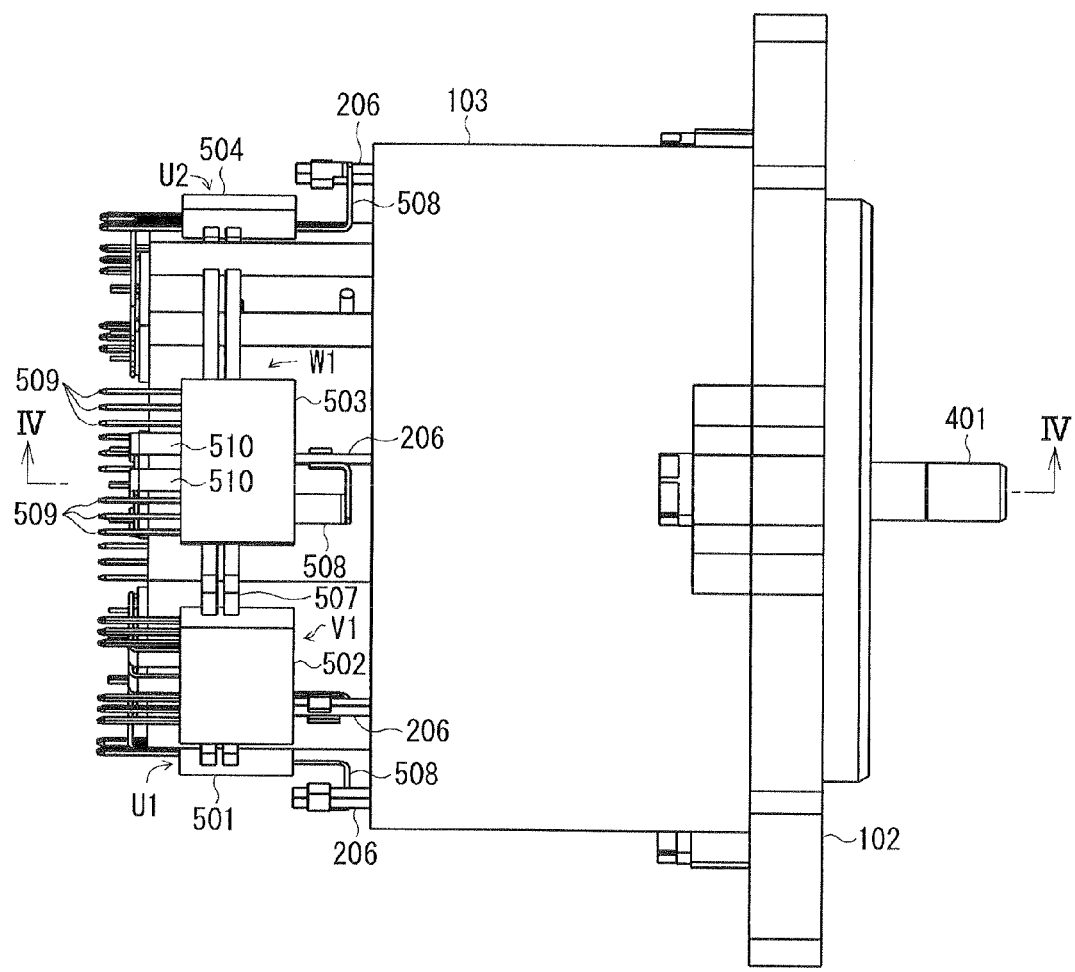
FIG. 3 is a side view showing the drive apparatus according to the first embodiment, which is viewed in the direction K in FIG. 2.

The semiconductor modules 501 to 506 has respective coil terminals 508 on a bottom side surface facing the partition wall 1031 of the motor case 103 as shown in FIG. 3. The lead wire 206 for supplying current to the coil 205 is taken out from the hole provided in the partition wall 1031 of the motor case 103 as described above. The lead wire 206 is clamped by and electrically connected to the coil terminal 508 of each semiconductor module 501 to 506.

Each of the semiconductor modules 501 to 506 has six control terminals 509 and two capacitor terminals 510 at the side opposite to the motor case 103. These terminals 509 and 510 protrude from the top side surface of the semiconductor module 501 to 506 in the axial direction opposite to the partition wall 1032 of the motor case 103. The control terminals 509 are welded to predetermined positions of the printed circuit board 801 as shown in FIG. 4. Thus, the semiconductor modules 501 to 506 are electrically connected to the control circuit 70 to provide the circuit connection shown in FIG. 1. The capacitor terminals 510 are connected to the power cable and the ground in the semiconductor modules 501 to 506. The capacitor terminals 510 are bent radially inward as shown in FIG. 2.

As shown in FIG. 2, six capacitors 701, 702, 703, 704, 705 and 706 are arranged in the radially inside part of the semiconductor modules 501 to 506, that is, at the same side of the semiconductor modules 501 to 506 as the choke coil 52. In case of differentiating the capacitors 701 to 706, these capacitors are referred to as a U1 capacitor 701, a V1 capacitor 702, a W1 capacitor 703, a U2 capacitor 704, a V2 capacitor 705 and a W2 capacitor 706. The six capacitors 701 to 706 and the corresponding six semiconductor modules 501 to 506 are arranged in the radial direction perpendicular to the central axis of the shaft 401.

The U1 capacitor 701, the V1 capacitor 702 and the W1 capacitor 703 correspond to the capacitors 56, 57 and 58 shown in FIG. 1, respectively. Although not shown, the U2 capacitor 704, the V2 capacitor 705 and the W2 capacitor 706 similarly correspond to the capacitors 56, 57 and 58, respectively.

The capacitors 701 to 706 are accommodated in the accommodation hole parts 606 of the heat sink 601 so that the capacitors 701 to 706 are located closely to the corresponding semiconductor modules 501 to 506, respectively. Each of the capacitors 701 to 706 is formed in a cylindrical shape and arranged with its central axis being in parallel to the central axis of the shaft 401. The capacitor terminals 510 of the semiconductor module 501 to 506 are bent in the radially inward direction such that the terminals of the capacitor 701 to 706 are directly connected to the capacitor terminals 510.

The control circuit 70 is formed on the printed circuit board 801 as shown in FIG. 4. The printed circuit board 801 is formed a wiring pattern by etching process or the like so that integrated circuits forming the control circuit 70 are mounted. The control circuit 70 is spaced apart from the choke coil 52, the semiconductor modules 501 to 507 and the capacitors 701 to 706.

The drive apparatus 1 according to the first embodiment provides the following advantage.

(1) In the drive apparatus 1, the semiconductor modules 501 to 506, the capacitors 701 to 706 and the choke coil 52 are located in the central axis direction of the shaft 401. The choke coil 52 is formed in a shape to allow the shaft 401 to pass therethrough. Thus, the drive apparatus 1 is reduced in size in the radial direction of the motor case 103. The semiconductor modules 501 to 506 and the choke coil 52 are positioned in the radial direction of the shaft 401, that is, in the direction perpendicular to the central axis of the shaft 401. The capacitors 701 to 706 and the semiconductor modules 501 to 506 are positioned in the radial direction, that is, in the direction perpendicular to the central axis of the shaft 401. Thus, the drive apparatus 1 is also reduced in size in the radial direction.

Figure 8:
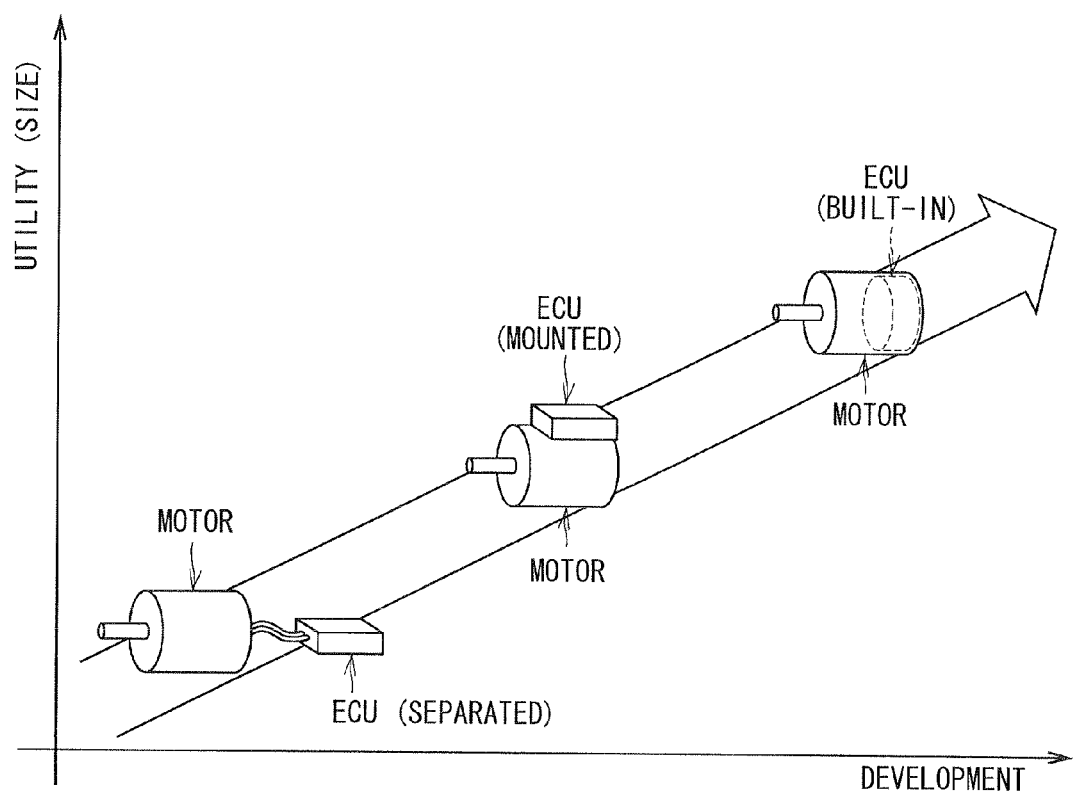
FIG. 8 is a diagram showing the history of development of a motor device.
Figure 9:
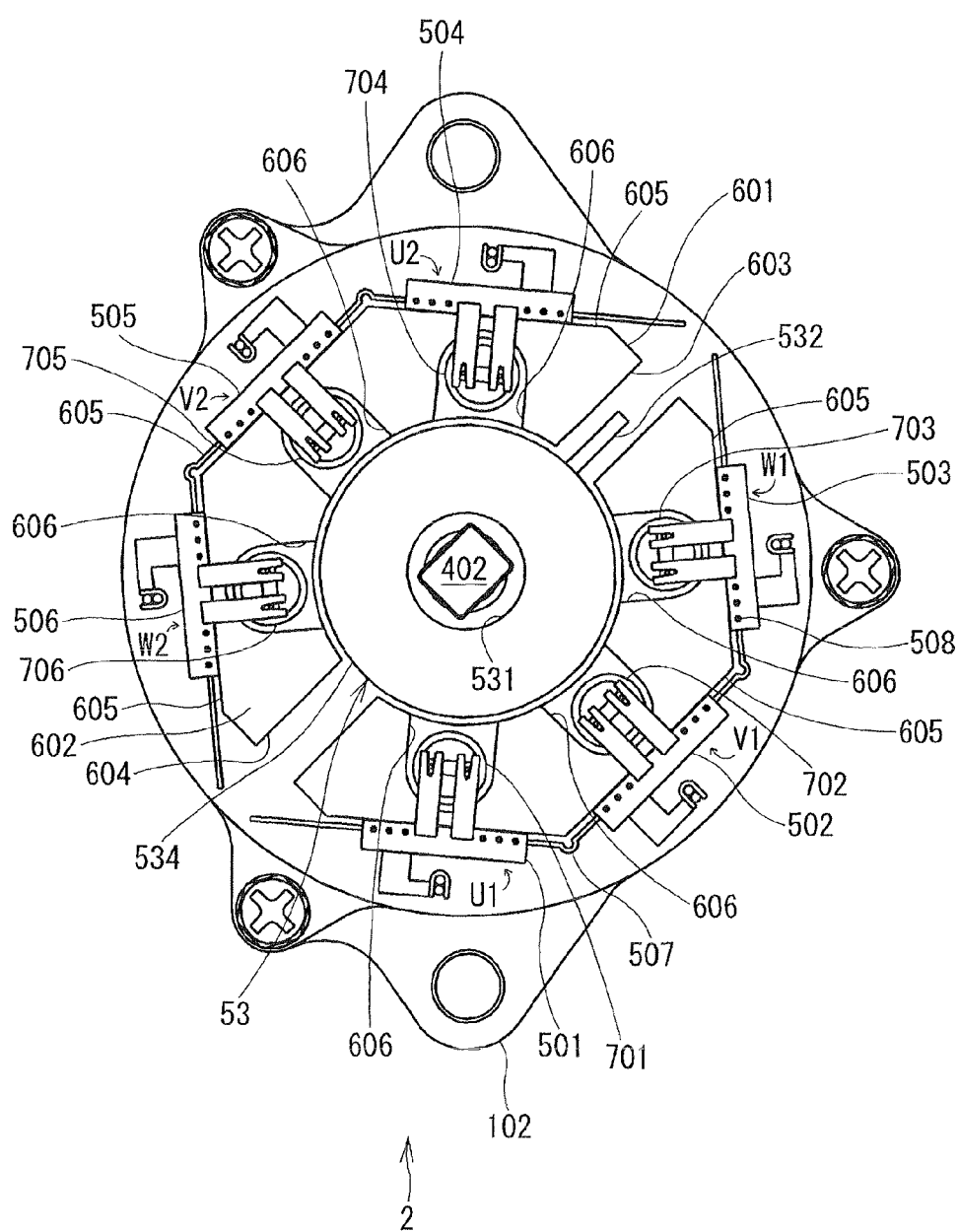
FIG. 9 is a top plan view showing a drive apparatus according to the second embodiment of the present invention.
Figure 10:
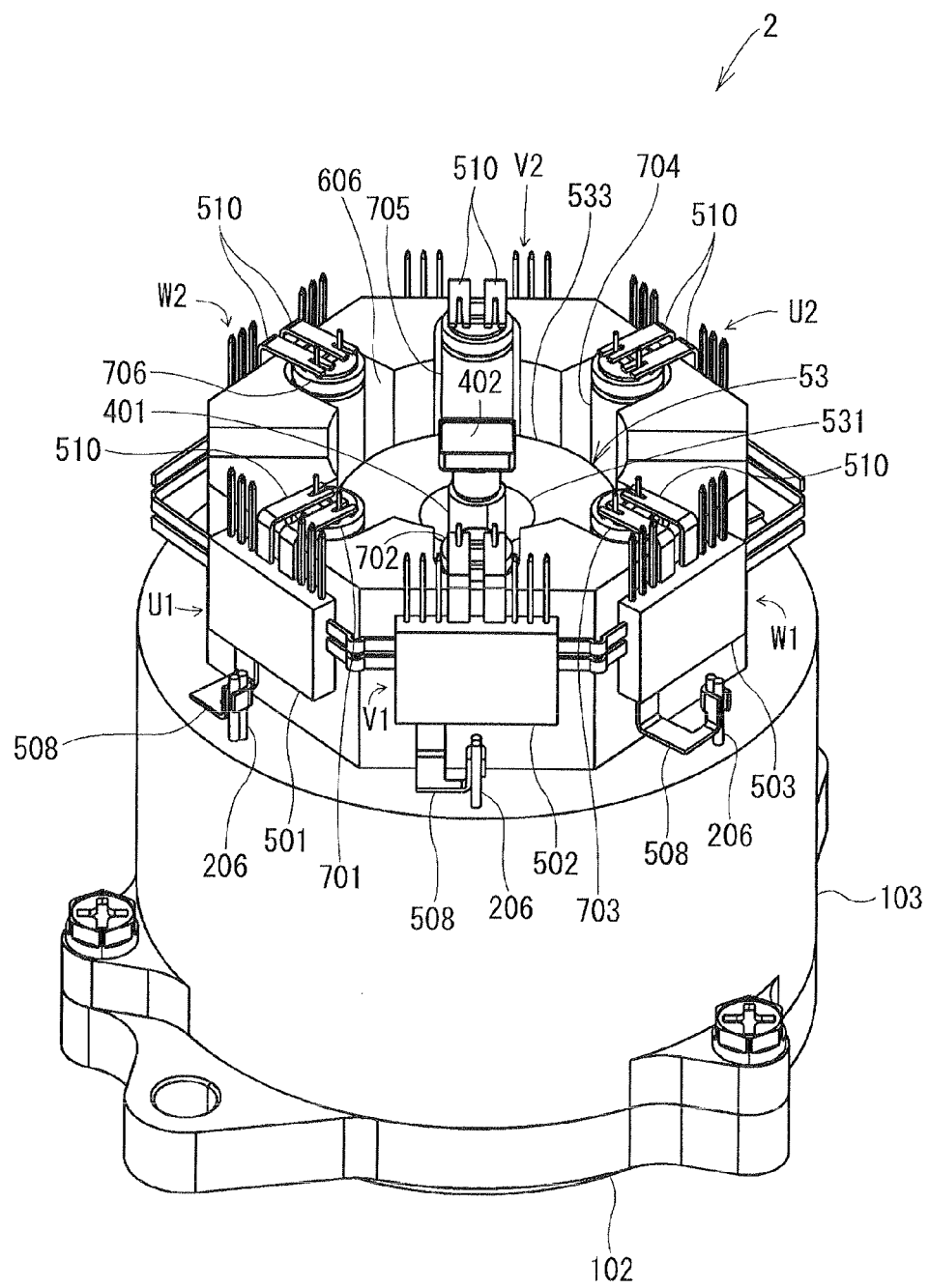
FIG. 10 is a perspective view showing the drive apparatus according to the second embodiment.

The motor for an EPS system has developed as shown in FIG. 8. Initially, a "separated" configuration was employed so that the motor was separate from the ECU. Then, a "mounted" configuration was frequently employed so that no wiring connections were needed. However, the "mounted" configuration was such that the electronic control unit (ECU) is housed in a case shaped like a rectangular parallelepiped and mounted outside a motor case. Next, a "built-in" configuration was employed so that the ECU was contained within a motor silhouette wherever possible. However, the use of the "built-in" configuration increased the axial physical size. As for the electronic circuit-integrated motor device 1, however, the choke coil 52 is arranged to surround the shaft 401. In addition, the space created by the use of such a configuration is utilized to improve the positional relationship of the semiconductor modules 501 to 506 and the capacitors 701 to 706. The electronic circuit-integrated motor device 1 employs an "integrated" configuration, which is superior to the "built-in" configuration.

(2) The choke coil 52 is shaped to have the central hole and receive the shaft 401 of the motor part 30 therethrough. Thus, the choke coil 52 is accommodated within the electric circuit-integrated motor, that is, within the drive apparatus 1. The shaft 401 is rotatably inserted in the central hole part of the choke coil 52, at which heat tends to remain. The heat remaining in the central part of the choke coil 52 is transferred to the shaft 401. Thus, radiation of heat of the choke coil 52 is promoted by the shaft 401, which rotates.

(3) The choke coil 52 is formed annularly, that is, in the ring shape and the shaft 401 is inserted into the choke coil 52. Since magnetic flux leaking from the coil winding 522 is attracted by the shaft 401, the magnetic field is suppressed from leaking externally.

(4) The capacitors 701 to 706 are positioned close to the semiconductor modules 501 to 506, respectively. The electric wiring between the semiconductor module 501 to 506 and the corresponding capacitor 701 to 706 can be shortened. The capacitors 701 to 706 are thus capable of exhibiting its performance fully. The capacitors 701 to 706 are provided for the semiconductor modules 501 to 506, respectively, that is, in one-to-one relation. The capacitance of the capacitor 701 to 706 can be reduced to a comparatively small value. The capacitor 701 to 706 can thus be reduced in size.

(5) The drive apparatus 1 has the heat sink 601, which extends in the axial direction of the shaft 401 from the partition wall 1031 of the motor case 103. The semiconductor modules 501 to 506 are attached to the side wall parts 602 of the heat sink 601, respectively. The heat of the semiconductor modules 501 to 506 is readily transferred to the heat sink 601. Thus, the drive apparatus 1 can be used in an electric power assist system, in which a large current flows in the motor part.

(6) The heat dissipation surface of the semiconductor module 501 to 506 is in contact with the side wall surface 605 of the heat sink 601. Thus, the heat dissipation from the semiconductor modules 501 to 506 is promoted. The side wall surface 605 is planar and hence the heat dissipation surfaces of the semiconductor modules 501 to 506 are also correspondingly planar. Thus, it is advantageous in that the side wall surfaces 605 can be machined to be flat readily.

(7) Two cut parts 603 and 604, which form the discontinuous part, are formed on the side wall surfaces 602. The coil winding 522 of the choke coil 52 is taken out in the radially outward direction by using the cut 603. Thus, wiring of the choke coil 52 can be made easily.

(8) The semiconductor modules 501 to 506 and the printed circuit board 801 are arranged in parallel in the axial direction of the motor case 801. The control terminals 509 provided on the semiconductor modules 501 to 506 are soldered to the printed circuit board 801. Thus, it is possible to configure the drive apparatus 1 such that the control circuit 70 may be positioned independently of the semiconductor modules 501 to 506, the capacitors 701 to 706 and the choke coil 52. Thus, the control circuit 70 can be configured to be separated from the semiconductor modules 501 to 506, the capacitors 701 to 706 and the choke coil 52, in which large currents flow. As a result, the control circuit 70 can be configured to be free from heat and magnetic noise, which are generated by such large currents.

(9) The magnet 402 is fixed to one axial end of the shaft 401, near which the printed circuit board 801 is positioned. Thus, the position sensor 73 mounted on the printed circuit board 801 detects the rotation position of the magnet 402 thereby to detect the rotation position of the shaft 401. The rotation of the motor part 30 can be detected comparatively readily.

(10) The choke coil 52 is distanced from the magnet 40, which forms a part of the rotation sensor, and located closely to the bearing 105 in the axial direction of the shaft 401. Thus, the magnetic field of the choke coil 52 is suppressed from influencing the magnetic field of the magnet 402 as much as possible.

(11) The semiconductor module 501 to 506 is provided for each of the U-phase, the V-phase and the W-phase in correspondence. Specifically, the U1 semiconductor module 501 and the U2 semiconductor module 504 are provided in correspondence to the U-phase. The V1 semiconductor module 502 and the V2 semiconductor module 505 are provided in correspondence to the V-phase. The W1 semiconductor module 503 and the W2 semiconductor module 506 are provided in correspondence to the W-phase. Further, the semiconductor modules 501 to 503 for one set of phases U1 to W1 and the semiconductor modules 504 to 506 for the other set of phases U2 to W2 are linked in the ring shape by the link member 507 to form the semiconductor module unit. Since the semiconductor modules 501 to 506 are semiconductor module in unit of functions, the inverter circuit 60 is simplified in configuration.

Second Embodiment

According to the second embodiment, as shown in FIGS. 9, 10 and 11A to 11C, a drive apparatus 2 is similar to the drive apparatus 1 of the first embodiment in respect of its electrical configuration and the motor 30 shown in FIG. 1. In these figures, the cover and the printed circuit board are not shown. The drive apparatus 2 is different in respect of the power circuit 50, particularly a choke coil 53.

Figure 11A:
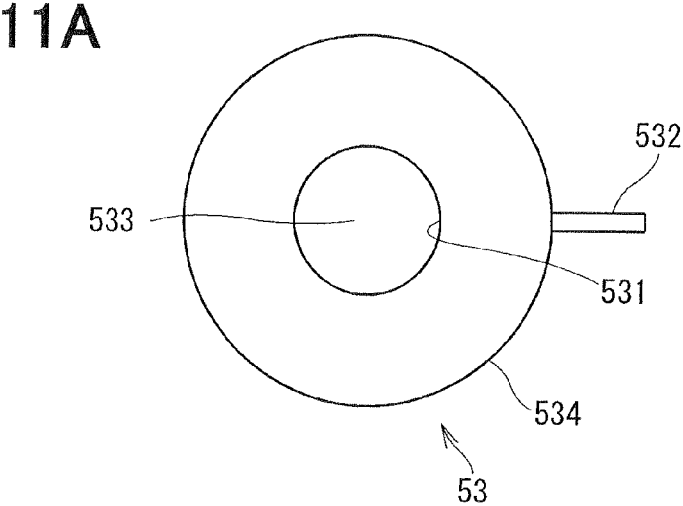
FIGS. 11A, 11B and 11C are a plan view, a side view and a perspective view showing a choke coil used in the drive apparatus according to the second embodiment.
Figure 11B:
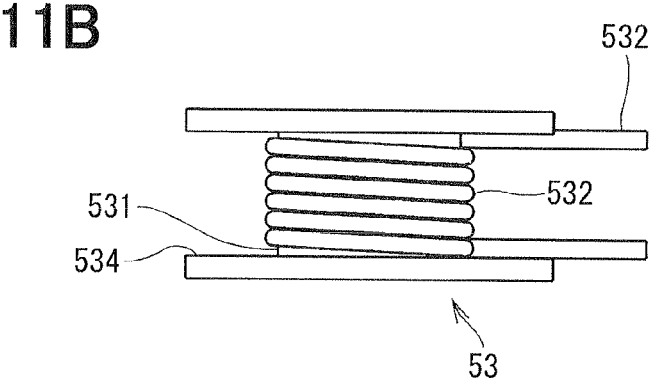
Figure 11C:
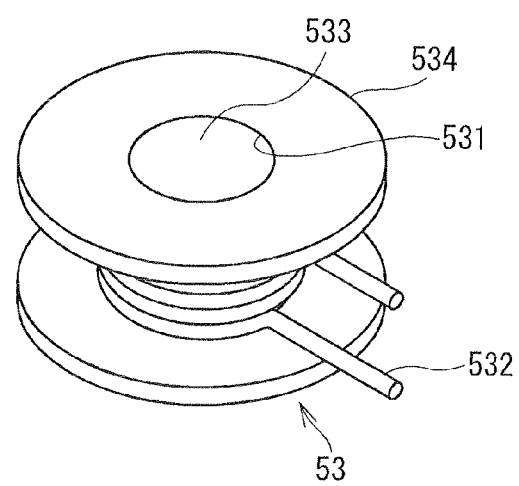
Figure 12:
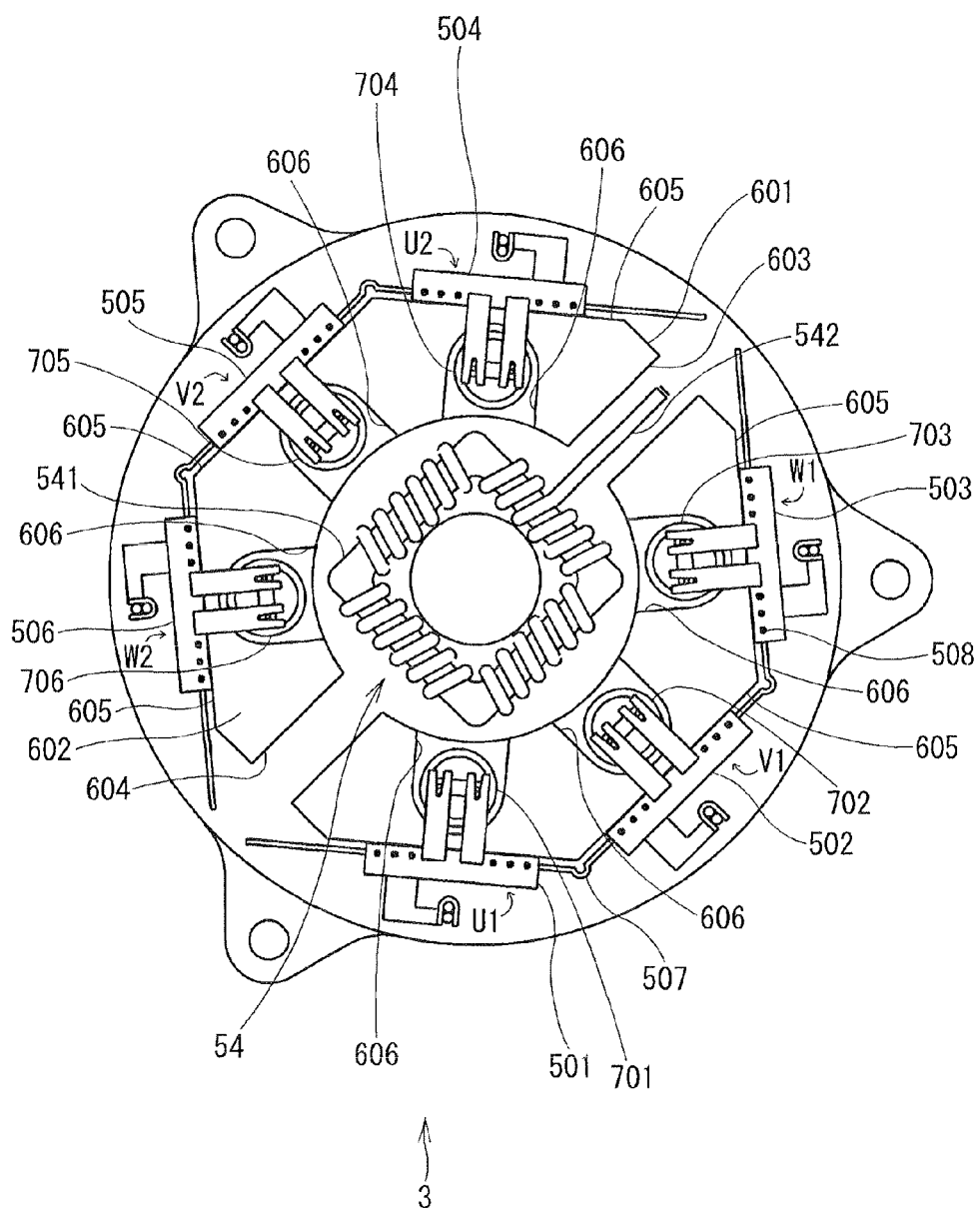
FIG. 12 is a top plan view showing a drive apparatus according to the third embodiment of the present invention.
Figure 13:
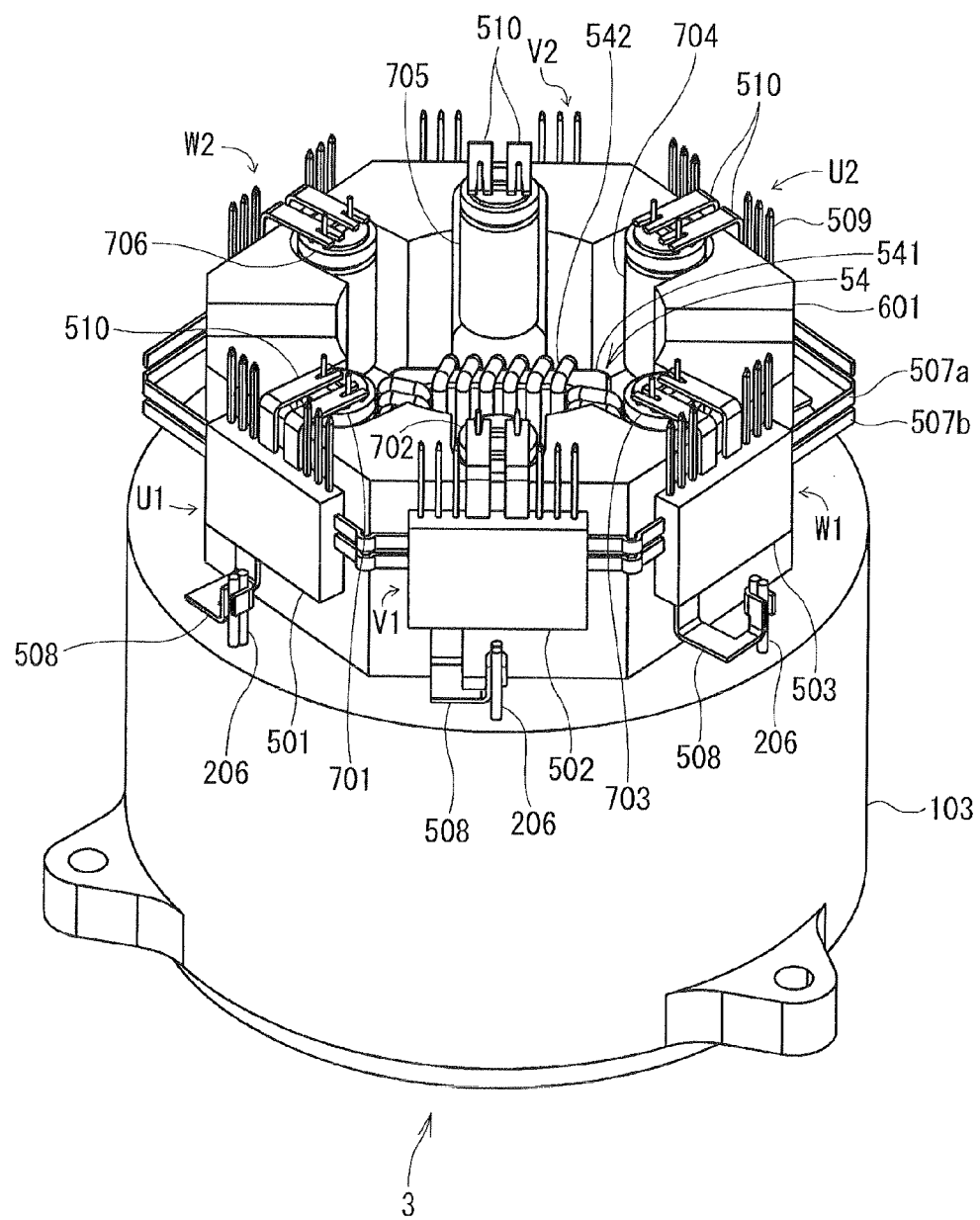
FIG. 13 is a perspective view showing the drive apparatus according to the third embodiment of the present invention.

Although the choke coil 53 is positioned in the similar manner as in the first embodiment, it is configured differently. As shown in FIGS. 11A to 11C, the choke coil 53 has a cylindrical core 531 formed in a cylindrical shape, a coil winding 532 and a pair of disk parts 534. The disk parts 534 have through holes 533 and provided at both axial ends of the cylindrical core 531. The coil winding 532 is wound about the cylindrical core 531.

The drive apparatus 2 also provides the advantages (1) to (12) of the drive apparatus 1.

Third Embodiment

According to the third embodiment, as shown in FIGS. 12, 13 and 14A to 14C, a drive apparatus 3 is similar to the drive apparatus 1 of the first embodiment in respect of its electrical configuration and the motor 30 shown in FIG. 1. In these figures, the cover and the printed circuit board are not shown. The drive apparatus 3 is different in respect of the power circuit 50, particularly a choke coil 54.

Figure 14A:
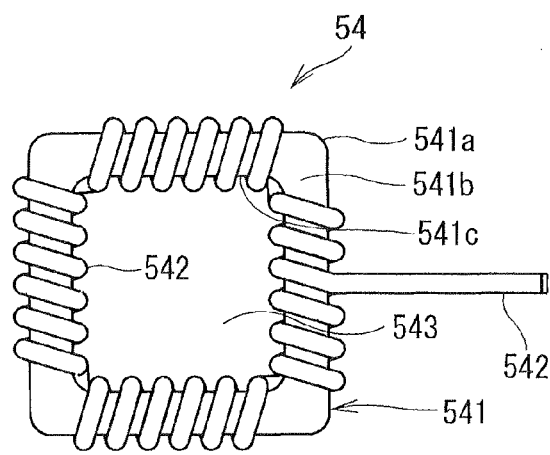
FIGS. 14A, 14B and 14C are a plan view, a side view and a perspective view showing a choke coil used in the drive apparatus according to the third embodiment.
Figure 14B:
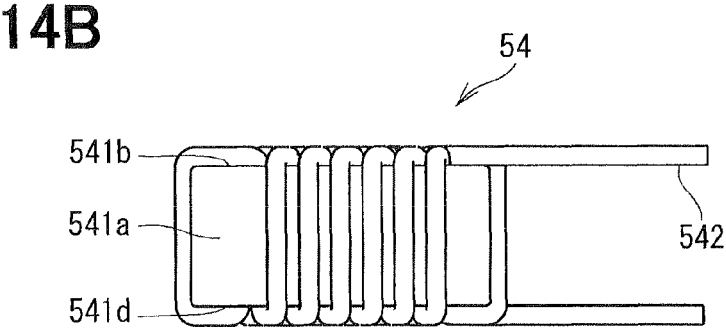
Figure 14C:
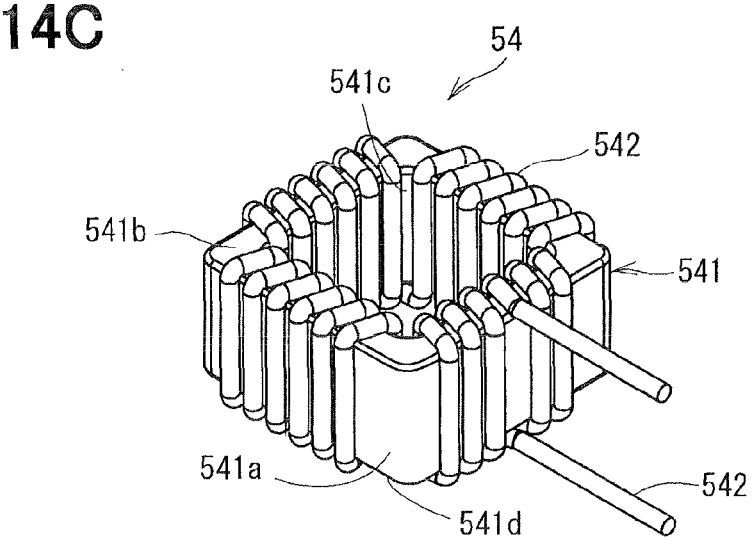

Although the choke coil 54 is positioned in the similar manner as in the first embodiment, it is configured differently. As shown in FIGS. 14A to 14C, the choke coil 54 has a frame core 541 formed in a square shape and a coil winding 542. The core 541 has a through hole 543 at its central part and thickness in the central axis direction. The core 541 has an outer side surface 541a and an inner side surface 541c, which are in parallel in the radial direction. The core 541 also has one axial end surface 541b and the other axial end surface 541d, which are in parallel in the axial direction.

As shown in FIG. 14A, the coil winding 542 is wound about the core 541a plurality of turns. Each turn starts from the one end surface 541b and returns to the one end surface 541b through the inner side surface 541c, the other end surface 541d and the outer side surface 541a.

The drive apparatus 3 also provides the advantages (1) to (12) of the drive apparatus 1.

The drive apparatuses 1 to 3 described in the first to the third embodiments may be used not only in the power steering system but also in the other systems such as a wiper system and a valve timing control system.

Further, the drive apparatus may be implemented in other ways different from the first to the third embodiments.

What is claimed is:

1. A drive apparatus comprising:
a motor, which has a cylindrical motor case, a stator, a rotor and a shaft, the stator being arranged radially inside the motor case and wound with coils of a plurality of phases, the rotor being arranged radially inside the stator, and the shaft being rotatable with the rotor; and
an electronic circuit, which has a semiconductor module, a capacitor and a choke coil, the semiconductor module being arranged in a central axis direction of the shaft relative to the motor case and configured to switch over coil currents flowing in the coils of the plurality of phases, the capacitor being connected in parallel to a power line and a ground line of the semiconductor module, and the choke coil provided in the power line of the semiconductor module,
wherein the choke coil has a hole in a central part thereof and is arranged with an axial end of the shaft passing therethrough, the axial end being opposite to another axial end of the shaft, from which rotary torque of the motor is output to an external side of the motor, and
wherein the capacitor is arranged radially inside the heat sink to face the semiconductor module through the heat sink in a radial direction of the shaft.

2. The drive apparatus according to claim 1, wherein: the choke coil is formed in a ring shape.

3. The drive apparatus according to claim 1, wherein: the choke coil is formed in a frame shape.

4. The drive apparatus according to claim 1, wherein: the choke coil is formed in a cylinder shape.

5. The drive apparatus according to claim 1, wherein: the semiconductor module and the capacitor are arranged in a direction perpendicular to the central axis of the shaft.

6. The drive apparatus according to claim 1, wherein: the semiconductor module has a heat dissipation plane, which is in contact with a side wall of a heat sink.

7. The drive apparatus according to claim 1, wherein: a heat sink is formed to have a planar surface at least partly on a side wall, the planer surface being linear in a plane perpendicular to the central axis of the shaft.

8. The drive apparatus according to claim 1, wherein: the electronic circuit includes a control circuit, which controls the semiconductor module; and
the control circuit is provided by using a printed circuit board, which is arranged perpendicularly to the central axis of the shaft.

9. A drive apparatus comprising:
a motor, which has a cylindrical motor case, a stator, a rotor and a shaft, the stator being arranged radially inside the motor case and wound with coils of a plurality of phases, the rotor being arranged radially inside the stator, and the shaft being rotatable with the rotor; and
an electronic circuit, which has a semiconductor module, a capacitor and a choke coil, the semiconductor module being arranged in a central axis direction of the shaft relative to the motor case and configured to switch over coil currents flowing in the coils of the plurality of phases, the capacitor being connected in parallel to a power line and a ground line of the semiconductor module, and the choke coil provided in the power line of the semiconductor module,
wherein the choke coil has a hole in a central part thereof and is arranged with the shaft passing therethrough,
wherein the choke coil and the semiconductor module are arranged side by side in a direction perpendicular to the central axis of the shaft and in a radial direction of he motor case, and
wherein the capacitor is arranged radially inside the heat sink to face the semiconductor module through the heat sink in a radial direction of the shaft.

10. The drive apparatus according to claim 9, wherein:
the choke coil is formed in a ring shape.
11. The drive apparatus according to claim 9, wherein:
the choke coil is formed in a frame shape.
12. The drive apparatus according to claim 9, wherein:
the choke coil is formed in a cylinder shape.
13. The drive apparatus according to claim 9, wherein:
the semiconductor module and the capacitor are arranged in a direction perpendicular to the central axis of the shaft.
14. The drive apparatus according to claim 9, wherein:
the semiconductor module has a heat dissipation plane, which is in contact with a side wall of a heat sink.
15. The drive apparatus according to claim 9, wherein:
a heat sink is formed to have a planar surface at least partly on a side wall, the planer surface being linear in a plane perpendicular to the central axis of the shaft.
16. The drive apparatus according to claim 9, wherein:
the electronic circuit includes a control circuit, which controls the semiconductor module; and
the control circuit is provided by using a printed circuit board, which is arranged perpendicularly to the central axis of the shaft.
17. A drive apparatus comprising:
a motor, which has a cylindrical motor case, a stator, a rotor and a shaft, the stator being arranged radially inside the motor case and wound with coils of a plurality of phases, the rotor being arranged radially inside the stator, and the shaft being rotatable with the rotor; and
an electronic circuit, which has a semiconductor module, a capacitor and a choke coil, the semiconductor module being arranged in a central axis direction of the shaft relative to the motor case and configured to switch over coil currents flowing in the coils of the plurality of phases, the capacitor being connected in parallel to a power line and a ground line of the semiconductor module, and the choke coil provided in the power line of the semiconductor module,
wherein the motor has a heat sink, which extends in the axial direction of the shaft from one axial end part of the motor case and is formed near a radially outside part of the choke coil,
wherein the semiconductor module is arranged on a side wall of the heat sink, and
wherein the choke coil has a hole in a central part thereof and is arranged with the shaft passing therethrough.
18. The drive apparatus according to claim 17, wherein:
the choke coil is formed in a ring shape.
19. The drive apparatus according to claim 17, wherein:
the choke coil is formed in a frame shape.
20. The drive apparatus according to claim 17, wherein:
the choke coil is formed in a cylinder shape.
21. The drive apparatus according to claim 17, wherein:
the semiconductor module and the capacitor are arranged in a direction perpendicular to the central axis of the shaft.
22. The drive apparatus according to claim 17, wherein:
the capacitor is arranged radially inside the semiconductor module.
23. The drive apparatus according to claim 17, wherein:
the semiconductor module has a heat dissipation plane, which is in contact with the side wall of the heat sink.
24. The drive apparatus according to claim 17, wherein:
the heat sink is formed to have a planar surface at least partly on the side wall, the planer surface being linear in a plane perpendicular to the central axis of the shaft.
25. The drive apparatus according to claim 17, wherein:
the electronic circuit includes a control circuit, which controls the semiconductor module; and
the control circuit is provided by using a printed circuit board, which is arranged perpendicularly to the central axis of the shaft.
26. A drive apparatus comprising:
a motor, which has a cylindrical motor case, a stator, a rotor and a shaft, the stator being arranged radially inside the motor case and wound with coils of a plurality of phases, the rotor being arranged radially inside the stator, and the shaft being rotatable with the rotor;
an electronic circuit, which has a semiconductor module, a capacitor and a choke coil, the semiconductor module being arranged in a central axis direction of the shaft relative to the motor case and configured to switch over coil currents flowing in the coils of the plurality of phases, the capacitor being connected in parallel to a power line and a ground line of the semiconductor module, and the choke coil provided in the power line of the semiconductor module; and
a rotation detection sensor for detecting rotation of the shaft,
wherein the choke coil has a hole in a central part thereof, is arranged with the shaft passing therethrough, and is positioned away from the rotation detection sensor not to influence magnetic field of the rotation detection sensor, and
wherein the capacitor is arranged radially inside the heat sink to face the semiconductor module through the heat sink in a radial direction of the shaft.
27. The drive apparatus according to claim 26, wherein:
the choke coil is formed in a ring shape.
28. The drive apparatus according to claim 26, wherein:
the choke coil is formed in a frame shape.
29. The drive apparatus according to claim 26, wherein:
the choke coil is formed in a cylinder shape.
30. The drive apparatus according to claim 26, wherein:
the semiconductor module and the capacitor are arranged in a direction perpendicular to the central axis of the shaft.
31. The drive apparatus according to claim 26, wherein:
the semiconductor module has a heat dissipation plane, which is in contact with a side wall of a heat sink.
32. The drive apparatus according to claim 26, wherein:
a heat sink is formed to have a planar surface at least partly on a side wall, the planer surface being linear in a plane perpendicular to the central axis of the shaft.
33. The drive apparatus according to claim 26, wherein:
the electronic circuit includes a control circuit, which controls the semiconductor module; and
the control circuit is provided by using a printed circuit board, which is arranged perpendicularly to the central axis of the shaft.
34. A drive apparatus comprising:
a motor, which has a cylindrical motor case, a stator, a rotor and a shaft, the stator being arranged radially inside the motor case and wound with coils of a plurality of phases, the rotor being arranged radially inside the stator, and the shaft being rotatable with the rotor;
an electronic circuit, which has a semiconductor module, a capacitor and a choke coil, the semiconductor module being arranged in a central axis direction of the shaft relative to the motor case and configured to switch over coil currents flowing in the coils of the plurality of phases, the capacitor being connected in parallel to a power line and a ground line of the semiconductor module, and the choke coil provided in the power line of the semiconductor module, wherein the motor has a heat sink, which extends in the central axis direction of the shaft from one axial end part of the motor case and has a cut part formed partly in the central axis direction of the shaft, wherein the semiconductor module is arranged on a side wall of the heat sink, wherein the choke coil has a hole in a central part thereof and is arranged with the shaft passing therethrough, and wherein the capacitor is arranged radially inside the heat sink to face the semiconductor module through the heat sink in a radial direction of the shaft.

35. The drive apparatus according to claim 34, wherein: the choke coil is formed in a ring shape.

36. The drive apparatus according to claim 34, wherein: the choke coil is formed in a frame shape.

37. The drive apparatus according to claim 34, wherein: the choke coil is formed in a cylinder shape.

38. The drive apparatus according to claim 34, wherein: the semiconductor module and the capacitor are arranged in a direction perpendicular to the central axis of the shaft.

39. The drive apparatus according to claim 34, wherein: the semiconductor module has a heat dissipation plane, which is in contact with the side wall of the heat sink.

40. The drive apparatus according to claim 34, wherein: the heat sink is formed to have a planar surface at least partly on the side wall, the planer surface being linear in a plane perpendicular to the central axis of the shaft.

41. The drive apparatus according to claim 34, wherein: the electronic circuit includes a control circuit, which controls the semiconductor module; and the control circuit is provided by using a printed circuit board, which is arranged perpendicularly to the central axis of the shaft.

42. A drive apparatus comprising:

a motor, which has a cylindrical motor case, a stator, a rotor and a shaft, the stator being arranged radially inside the motor case and wound with coils of a plurality of phases, the rotor being arranged radially inside the stator, and the shaft being rotatable with the rotor;

an electronic circuit, which has a semiconductor module, a capacitor and a choke coil, the semiconductor module being arranged in a central axis direction of the shaft relative to the motor case and configured to switch over coil currents flowing in the coils of the plurality of phases, the capacitor being connected in parallel to a power line and a ground line of the semiconductor module, and the choke coil provided in the power line of the semiconductor module, wherein the semiconductor module is a part of a semiconductor module unit of a plurality of semiconductor modules, which is linked by a bus bar, wherein the choke coil has a hole in a central part thereof and is arranged with the shaft passing therethrough, and wherein the capacitor is arranged radially inside the heat sink to face the semiconductor module through the heat sink in a radial direction of the shaft.

43. The drive apparatus according to claim 42, wherein: the choke coil is formed in a ring shape.

44. The drive apparatus according to claim 42, wherein: the choke coil is formed in a frame shape.

45. The drive apparatus according to claim 42, wherein: the choke coil is formed in a cylinder shape.

46. The drive apparatus according to claim 42, wherein: the semiconductor module and the capacitor are arranged in a direction perpendicular to the central axis of the shaft.

47. The drive apparatus according to claim 42, wherein: the semiconductor module has a heat dissipation plane, which is in contact with a side wall of a heat sink.

48. The drive apparatus according to claim 42, wherein: a heat sink is formed to have a planar surface at least partly on a side wall, the planer surface being linear in a plane perpendicular to the central axis of the shaft.

49. The drive apparatus according to claim 42, wherein: the electronic circuit includes a control circuit, which controls the semiconductor module; and the control circuit is provided by using a printed circuit board, which is arranged perpendicularly to the central axis of the shaft.

* * * * *